(12) United States Patent
Ng et al.

(10) Patent No.: US 11,399,069 B2
(45) Date of Patent: Jul. 26, 2022

(54) METHOD AND APPARATUS TO IMPLEMENT A HOME COMPUTING CLOUD

(71) Applicant: Computime Ltd., New Territories (HK)

(72) Inventors: Yau Wai Ng, Hong Kong (CN); Hung Bun Choi, Hong Kong (CN); Chun Kit Chu, Hong Kong (CN)

(73) Assignee: Computime Ltd., New Territories (HK)

(*) Notice: Subject to any disclaimer, the term of this patent is extended or adjusted under 35 U.S.C. 154(b) by 317 days.

(21) Appl. No.: 16/840,708

(22) Filed: Apr. 6, 2020

(65) Prior Publication Data

US 2021/0314407 A1 Oct. 7, 2021

(51) Int. Cl.

| | |
|---|---|
| *H04L 29/08* | (2006.01) |
| *G06N 5/04* | (2006.01) |
| *G06N 5/02* | (2006.01) |
| *G06F 16/28* | (2019.01) |
| *G06F 16/242* | (2019.01) |
| *H04L 29/06* | (2006.01) |
| *H04L 67/141* | (2022.01) |

(Continued)

(52) U.S. Cl.
CPC ........ *H04L 67/141* (2013.01); *G06F 16/2438* (2019.01); *G06F 16/284* (2019.01); *G06N 5/027* (2013.01); *G06N 5/04* (2013.01); *H04L 69/08* (2013.01); *H04W 84/12* (2013.01)

(58) Field of Classification Search
CPC .......... G06N 5/047; G06N 5/027; G06N 5/04; G06N 3/08; H04L 69/08; H04L 67/141; H04L 67/2809; H04L 67/26; H04L 67/12; H04W 84/12; G06F 16/2438; G06F 16/284

See application file for complete search history.

(56) References Cited

U.S. PATENT DOCUMENTS

| | | | |
|---|---|---|---|
| 7,200,809 B1* | 4/2007 | Paul ................... | G06F 16/9577 715/205 |
| 10,178,177 B2* | 1/2019 | McLaughlin .......... | H04L 63/02 |

(Continued)

OTHER PUBLICATIONS

Jul. 2, 20217—(WO) International Search Report and Written Opinion—PCT/US2021/025958.

(Continued)

*Primary Examiner* — Abdullahi E Salad
(74) *Attorney, Agent, or Firm* — Banner & Witcoff, Ltd.

(57) ABSTRACT

A home computing system (cloud) integrates a protocols gateway, WiFi router, cloud server, and mass storage device to support one or more Internet of Things (IoT) devices, possibly with different connectively protocols, in a local environment such as a residential home. The home computing cloud often reduces the amount of data traffic sent to a public computing cloud by locally processing collected device data rather than by sending the device data to the public computer cloud for processing. The home computing cloud may download an appropriate data analytic model from the public computing cloud, locally train (for example, reinforcement learning) the model, and locally execute the trained model to obtain prediction information from collected IoT device data. The home computing cloud also allows direct access of the connected IoT devices by user applications via the internet, through a protocols gateway and an IoT message translator.

18 Claims, 13 Drawing Sheets

(51) Int. Cl.
   *H04L 69/08*   (2022.01)
   *H04W 84/12*   (2009.01)

(56) References Cited

U.S. PATENT DOCUMENTS

| | | | |
|---|---|---|---|
| 2013/0128043 A1* | 5/2013 | Avnery | H04N 7/181 |
| | | | 348/148 |
| 2014/0149599 A1* | 5/2014 | Krishna | H04L 69/08 |
| | | | 709/232 |
| 2015/0281871 A1* | 10/2015 | Poulsen | H04L 12/46 |
| | | | 370/328 |
| 2016/0205106 A1 | 7/2016 | Yacoub et al. | |
| 2017/0331899 A1 | 11/2017 | Binder et al. | |
| 2018/0131770 A1 | 5/2018 | Doraiswamy et al. | |
| 2018/0213378 A1 | 7/2018 | Brown et al. | |
| 2018/0246484 A1* | 8/2018 | Zimmerman | H04L 67/16 |
| 2019/0260808 A1* | 8/2019 | Elghandour | H04L 41/0809 |
| 2019/0369984 A1* | 12/2019 | Malladi | G06F 8/70 |

OTHER PUBLICATIONS

U.S. Appl. No. 16/840,848, filed Apr. 6, 2020, A Local Computing Cloud That is Interactive With a Public Computing Cloud.

* cited by examiner

METHOD AND APPARATUS TO IMPLEMENT A HOME COMPUTING CLOUD

TECHNICAL FIELD

Aspects of the disclosure relate to implementation of a local computing cloud that interacts directly to mobile devices, for example a mobile phone, for accessing the remote IoT devices. The local computing cloud may be located in a home and may support one or more Internet of Things (IoT) devices which use different wireless communication protocols. Messages between IoT devices and user applications are bridged through an IoT protocol via internet. The messages are exchanged upon request by user applications, for example, via a mobile application. The local computing cloud may also be connected to a public computing cloud, where the local computing cloud may download appropriate analytic models for local execution. Reinforcement training of the model may be conducted by the local computing cloud, with appropriated hardware.

BACKGROUND OF THE INVENTION

Internet of Things (IoT) applications often rely on remote and centralized servers to collect input data, and based on the current input as well as the historical data, to generate certain actions. This approach typically requires IoT devices, such as smart sensors, thermostats, and smart appliances, to exchange data between themselves and a remote server, such as a public computing cloud. With another approach, a gateway may be needed to convert data from one connectivity protocol to another in order to send data from the end devices to the remote server, for example, ZigBee to WiFi. The huge amount of data transmission between the end devices and the remote server often results in an expensive service cost. Moreover, this may create a huge amount of data traffic in the network, which may result in extra network latency, data loss during transmission, or an expensive maintenance cost in order to maintain a desired quality of service level. In addition, data security and privacy are an important concern, despite the storage cost, when storing large amounts of personalized data in a public computing cloud.

SUMMARY OF THE INVENTION

A home computing system (which may be referred to as a ☐home computing cloud☐) integrates a protocols gateway, WiFi router, cloud server, and mass storage device to support one or more Internet of Things (IoT) devices in a local environment such as a residential home. Because the home computing cloud locally processes collected device data rather than sending the device data to a public computing cloud (system) for processing, the home computing cloud often reduces the amount of data traffic being sent to a public computing cloud. Data privacy may be maintained by keeping the source data, the data manipulation, and the predictive results locally. In order to do so, the home computing cloud may download an appropriate data analytic model (which may be referred to as a ☐model☐) from the public computing cloud. The home computing cloud may then execute the model locally by obtaining device data from one or more IoT devices, applying some or all of the device data to the model, and obtaining a predictive result from the model. The predictive result may then be applied to one or more of the supported IoT devices to affect the operation of the one or more IoT devices.

With another aspect, a home computing cloud downloads an appropriate pre-trained model together with the corresponding learning algorithms from the public computing cloud. The home computing cloud then locally performs reinforcement training to the model with real-time IoT device data.

With another aspect, a home computing cloud downloads a simple pre-trained model together with the corresponding learning algorithms from the public computing cloud. The home computing cloud then performs reinforcement training to the model to accommodate the environment of the home computing cloud (for example, the types of supported IoT devices).

With another aspect, a home computing cloud supports a rules engine that is updated by information from a downloaded data analytic model.

With another aspect, a home computing cloud includes a protocols gateway configured to interface with one or more IoT devices (for example, smart sensors, thermostats, and smart appliances) and an IoT message translator to enable the IoT devices to exchange information with user applications, for example a mobile application, via the home computing cloud.

With another aspect, a home computing cloud includes a protocols gateway. The protocols gateway supports a plurality of different radio types (for example, a Zigbee gateway for ZigBee, a Z-Wave gateway for Z-Wave, and a BLE central for Bluetooth Low Energy (BLE), and so forth).

With another aspect, a home computing cloud includes an IoT message translator (which may be referred to as a ☐message translator☐). The message translator includes an IoT protocol message broker (which may be referred to as a message broker, such as an MQTT broker) and an IoT protocol message bridge (which may be referred to as a ☐message bridge). The message broker supports publishing of messages from one or more IoT devices and subscribing of the messages from a user application. The message bridge maps a message conforming to one of the plurality of radio types to an IoT protocol message (for example, an MQTT/Zigbee bridge for Zigbee devices, an MQTT/Z-Wave bridge for Z-Wave devices and an MQTT/BLE bridge for BLE devices, etc.).

With another aspect, as an example, when a user wants to check the status of a Zigbee device or to control it from a mobile (user) application, the request may be sent via the internet to the MQTT broker within the home computing cloud. The request may then be converted to Zigbee format by the corresponding MQTT/Zigbee bridge and forwarded to the Zigbee device by the Zigbee gateway.

With another aspect, a home computing cloud supports an IP updater that may send a request to a DNS server to update the IP address assigned to the home computing cloud.

With another aspect, a home computing cloud supports an IoT web console that reads device data from one or more supported IoT devices and allows a user to control one or more IoT devices. The IoT web console may be interactive with a mobile app executing on a mobile device.

BRIEF DESCRIPTION OF THE DRAWINGS

The foregoing summary of the invention, as well as the following detailed description of exemplary embodiments of the invention, is better understood when read in conjunction with the accompanying drawings, which are included by way of example, and not by way of limitation with regard to the claimed invention.

DETAILED DESCRIPTION

Figure 1:
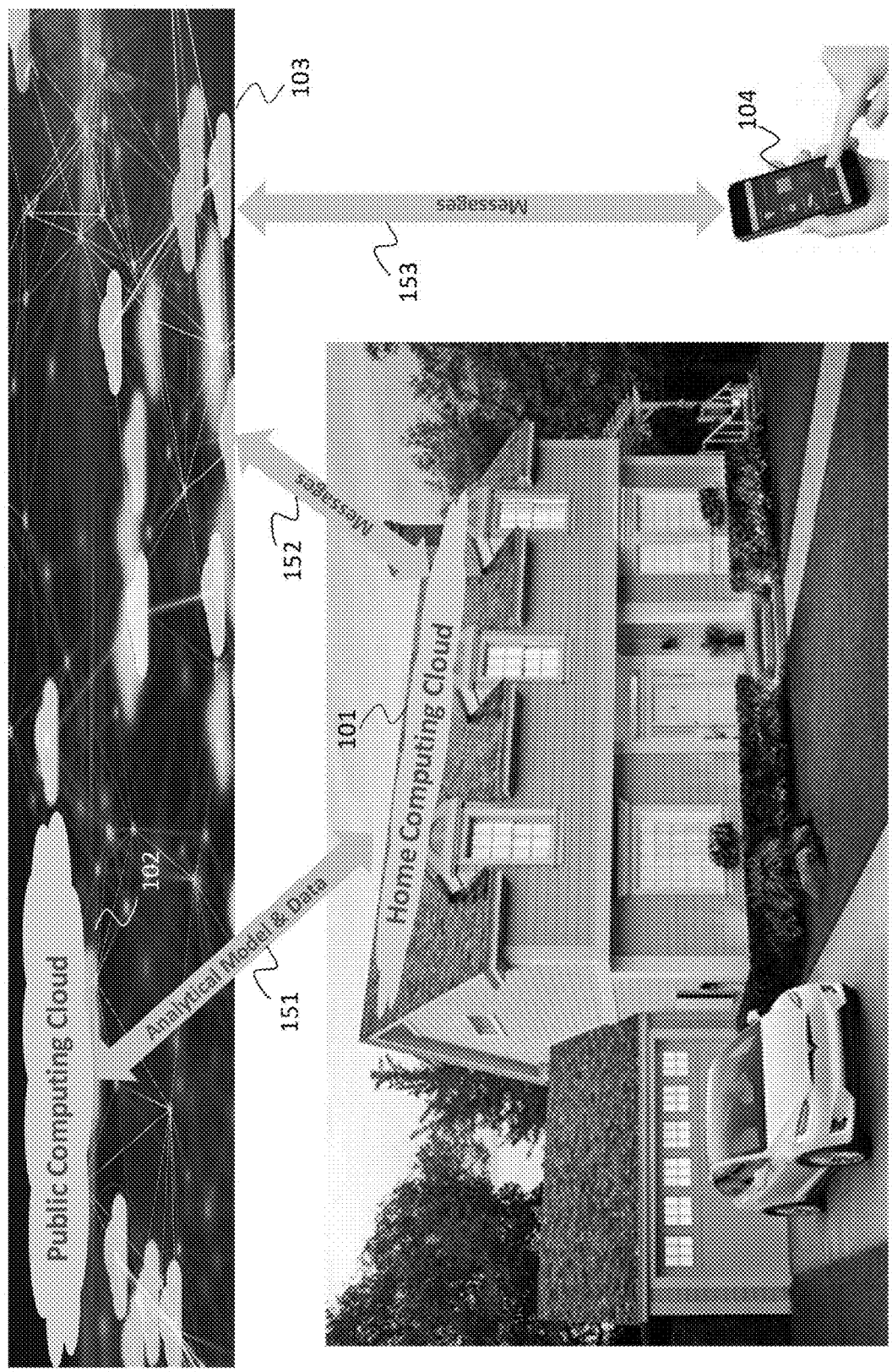
FIG. 1 shows a home environment in which a home computing cloud is interactive with internet, a public computing cloud and a mobile phone (executing a user application0 in accordance with an embodiment.

A home computing cloud may not be limited to a residential home and may support other types of entities such as a business or building. Consequently, a ⌊home computing cloud may be construed as a ⌐ocal computing cloud. Also, a ⌊cloud may be referred to a computing system or the like.

According to an aspect of the embodiments, a home computing cloud integrates a protocols gateway, an IoT message translator, a WiFi router, a cloud server, and mass storage device to support one or more Internet of Things (IoT) devices in a local environment such as a residential home. Because the home computing cloud locally processes collected device data rather than sending the device data to a public computing cloud for processing, the home computing cloud often reduces the amount of data traffic sent to a public computing cloud. This approach also improves data privacy by keeping all the source data locally for analysis, learning, and archiving. In order to do so, the home computing cloud has sufficient computational power, cash memory, and data storage for running data analytic models, learning algorithms, and storing vast amount of data.

With another aspect of the embodiment, the home computing cloud may interact with a public computing cloud in order to exchange information that is pertinent to the one or more IoT devices. For example, the public computing cloud may provide the outdoor temperature and geolocation of a user to a thermostat, and the thermostat may include the outdoor temperature, the location of the user, and the temperature set-point to control the relays.

With another aspect of the embodiment, the public computing cloud (which may be referred to a ⌐public cloud ⌐) may provide computing services offered by third-party providers over the public Internet, making them available to anyone who wants to use or purchase them (for example an analytic model for energy savings, an analytic model for predictive maintenance, and so forth). The services may be free or sold on-demand, thus allowing customers to pay only per usage for consumed CPU cycles, storage, or bandwidth.

With another aspect of the embodiment, the home computing cloud may support as many wireless communication protocols as possible to allow IoT devices, which implement different wireless communication protocols, interacting with each other. Embodiments support a variety of wireless protocols, including but not limited to, WiFi, Zigbee, Z-Wave and BLE (Bluetooth Low Energy), so forth.

BLE and ZigBee devices typically operate in the 2.4 GHz frequency band while Z-Wave devices typically operate in the Sub-1G band. WiFi devices typically operate in the 900 MHz, 2.4 GHz, 3.6 GHz, 4.9 GHz, 5 GHz, 5.9 GHz, and 60 GHz frequency bands.

With another aspect of the embodiment, the home computing cloud may include one or more IoT devices that are located in a home. Embodiments support a variety of IoT devices, including but not limited to, wireless sensors, smart thermostats, smart appliances, lighting devices, security devices, and so forth.

With another aspect of the embodiment, the home computing cloud may support one or more IoT protocols to enable the accessibility by user applications via the internet.

With another aspect of the embodiment, the home computing cloud may implement an IoT message bridge to translate a communication protocol to an IoT protocol, such that user application may communicate with the IoT devices via the protocols gateway and message translator.

With another aspect of the embodiment, a rules engine may be added to the home computing cloud to support artificial intelligence.

With another aspect of the embodiment, communication between the home computing cloud and user applications may be initiated by the user applications or the predefined rules in the rule engine.

FIG. 1 shows a home computing cloud 101 resides in a home environment in accordance with an embodiment. The home computing cloud 101 allows a user application 104 to be accessed using data channels 152, 153 via internet 103. At the same time, the home computing cloud 101 interacts with a public computing cloud 102 via data channel 151.

While FIG. 1 depicts an operating environment spanning a home, embodiments may span other local environments such as a building or a business location.

An IoT device (not explicitly shown) may be an interrelated computing device (for example, a smart thermostat or appliance) within a home that provides sent information and obtains received information via home computing cloud 101. The received information may be indicative of one or more actions that the IoT device should perform.

IoT devices may support different wireless communication protocols. Exemplary protocols include, but are not limited to, WiFi, ZigBee, Z-Wave and BLE.

Communication between the home computing cloud and the user application may be initiated via user applications or rules predefined in the rule engine. The communication protocol may be, but not limited to, WiFi, Ethernet, LTE and NB-IoT. The IoT protocols may be, but are not limited to, MQTT, CoAP and LwM2M, and so forth.

The protocols for the communication between the home computing cloud and the public computing cloud may be identical to those used for the user application. However, different protocols may be used depending on the application scenarios, for example, a discrete data versus a continuous streaming signal.

Data traffic capacity, data security, and data privacy are important considerations when implementing an Internet of Things (IoT) system. By minimizing traffic on data channels 151, 152, and 153 between internet 103 and the application environment supported by home computing cloud 101 as well as by minimizing the amount of data stored inside public computing cloud 102, the exposure of the data from unauthorized access may be reduced. Moreover, the data traffic may be reduced and hence the cost in using the service provided by public computing cloud 102. By storing data within home computing cloud 101 and conducting data analytic and machine learning from within home computing cloud 101, services are maintained when internet connection is inaccessible. Moreover, the latency introduced from internet connection may be eliminated. However, one may not completely circumvent the services provided by public computing cloud 102 as it often provides computational power and software services in which home computing cloud 101 may not be able to provide.

Figure 2:
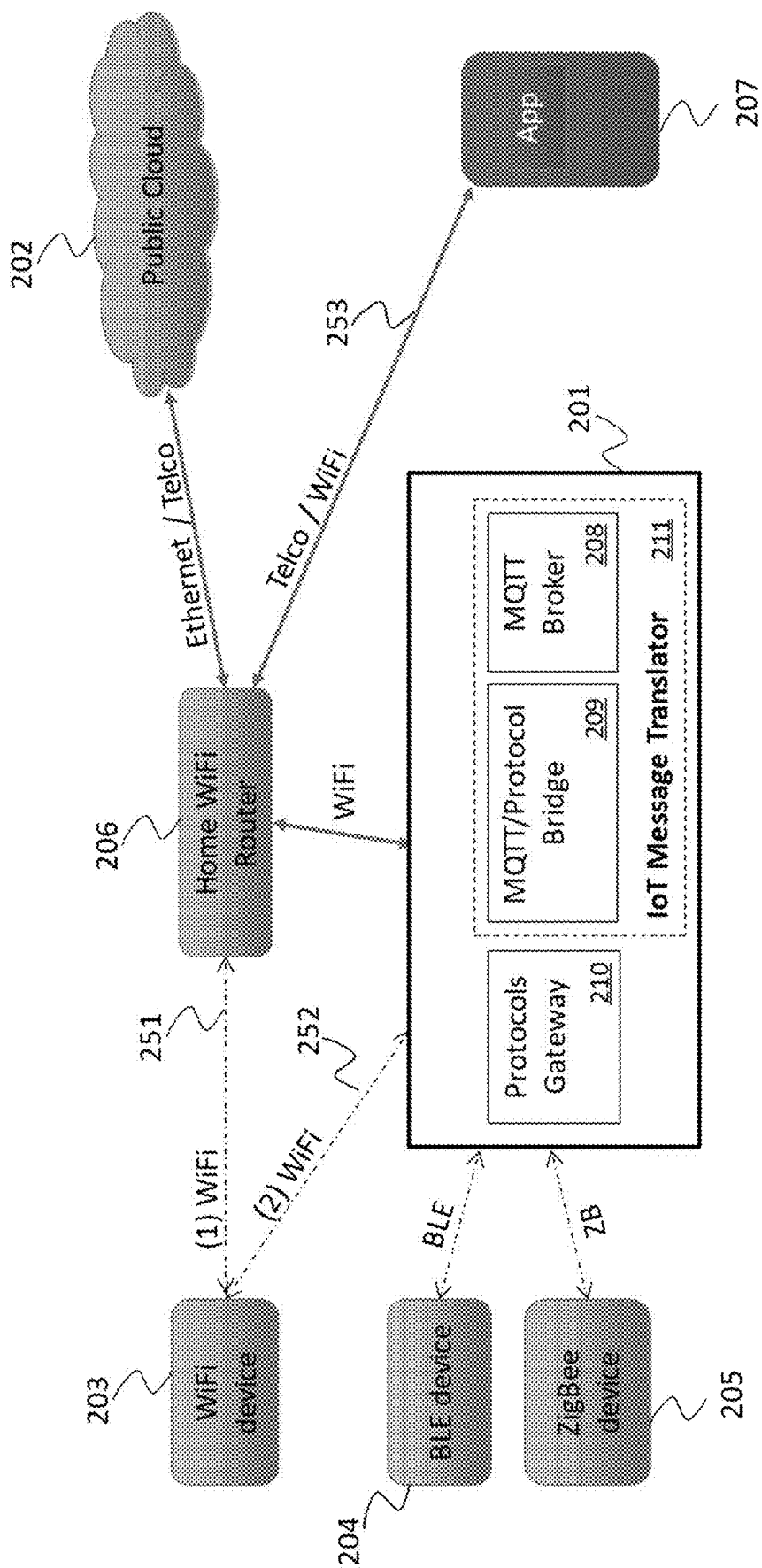
FIG. 2 shows a home computing cloud without a WiFi router capability in accordance with an embodiment.

FIG. 2 shows a home computing cloud (HCC) 201 associated with a separate WiFi router 206 that interacts with user application 207 and public computing cloud (PCC) 202 in accordance with an embodiment.

The interactions between local IoT devices 204-205 and user application 207 may be supported by a protocol gateway 210 and an IoT message translator 211 running on home computing cloud 201. IoT devices 204-205 communicate with the corresponding protocols (for example, Zigbee) via a protocol gateway 210. Protocol gateway 210 passes the devices messages to an IoT message translator 211, which comprises an IoT protocol message broker 208 (for example, MQTT broker) or CoAP server (not explicitly shown) and an IoT protocol message bridge 209 (for example, MQTT/Zigbee bridge). With message translator 211, IoT devices messages are bridged into IoT protocol messages (for examples, MQTT messages) and sent to other devices or user applications. As an example, an MQTT message from Zigbee device 205 may be sent to the home computing cloud 201, which terminate to a rules engine that subscribes to corresponding device topics. The rule engine may then trigger an alert to be sent to mobile application 207 to draw the user's awareness. The user may respond by initiating an action through mobile application 207, and the mobile application 207 consequently generates a MQTT message that is sent via the internet to home computing cloud (HCC) 201. Home computing cloud 201 comprises message translator 211 and protocol gateway 210 that converts the MQTT message to a Zigbee message. The Zigbee message is then conveyed the Zigbee device 205 via protocols gateway 210 to execute an operation based on the user's action.

With some embodiments, protocols gateway 210 and/or IoT message translator 211 may be implemented by a dedicated electronic device that include one or more processing devices. The dedicated electronic device may also include one or more application-specific integrated circuits (ASICs), complex programmable logic devices (CPLDs), field-programmable gate arrays (FPGAs), or other integrated circuits.

Figure 4:
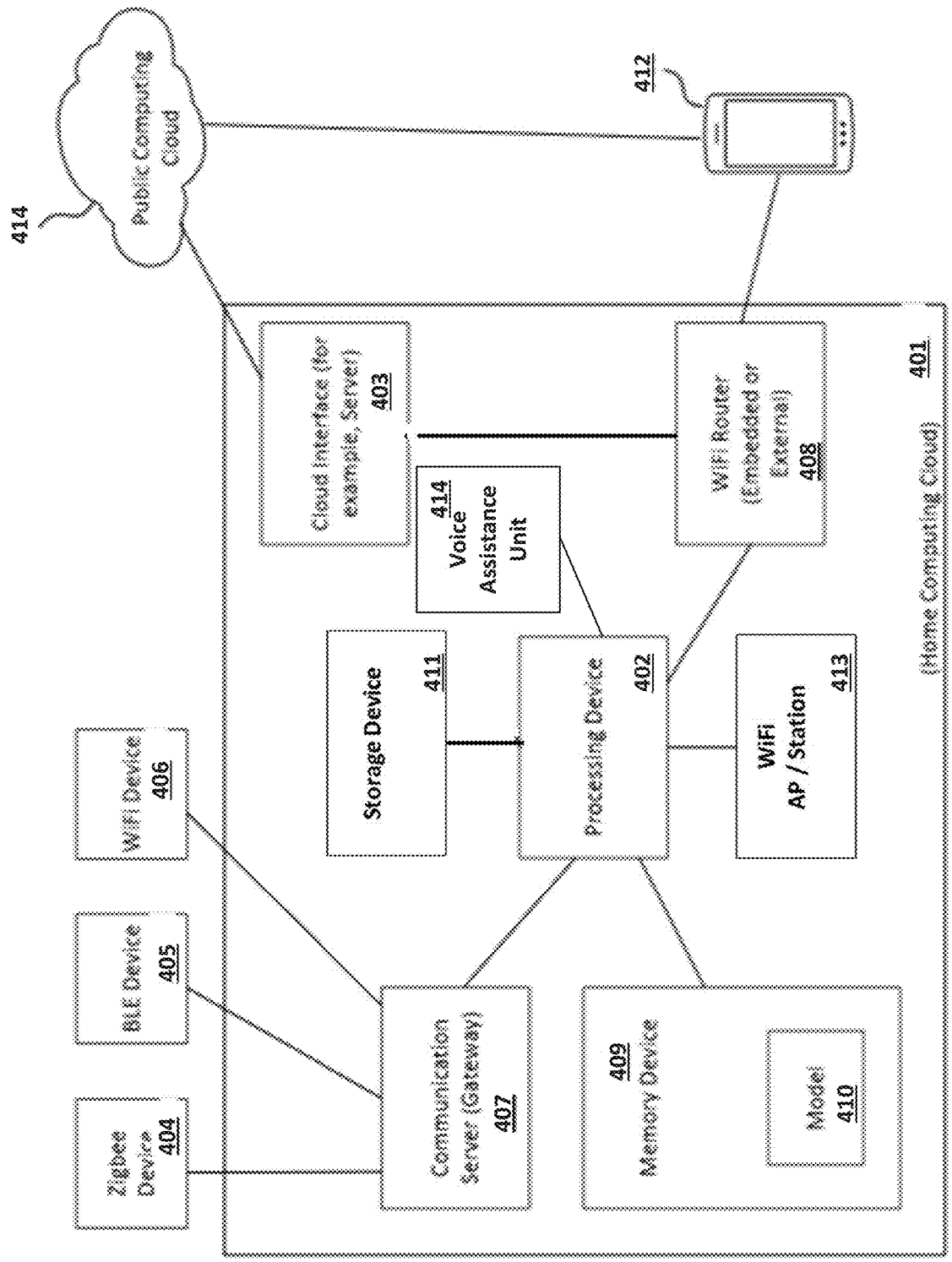
FIG. 4 shows a home computing cloud that is interactive with a public computing cloud and a user application in accordance with an embodiment.

Alternatively, protocols gateway 210 and/or IoT message translator 211 may be implemented with processor 402 (as shown in FIG. 4 as will be discussed) executing computer executable instructions from a computer-readable medium (for example, memory device 409).

WiFi devices (for example, device 203) that support the MQTT client may also connect to MQTT broker (server) 208 within HCC 201.

Device data collected by home computing cloud 201 may be stored into a mass data storage device (for example storage device 411 shown FIG. 4) and thus the additional cost to send the collected data back and forth with public computing cloud 201 is circumvented.

Because large amounts of IoT data may be stored in the mass storage device (for example, many gigabytes), the stored data may be organized in a relational database for efficient management of the data. Embodiments may include embedded database software (for example, SQLite) to support stored IoT data if organized in a database relationship.

The communication between WiFi device 203 and home computing cloud 201 may occur through two different paths 251 or 252, depending on which WiFi access point WiFi device 203 is connected to. For path 251, the MQTT message from WiFi device 203 is routed from home WiFi router 206 to MQTT broker 208, which may direct the MQTT messages to other IoT devices (for example, devices 204 and/or 205) or to user application 207 via WiFi router 206 and the internet. With path 252, WiFi device 203 is directly connected to home computing cloud 201, which is acting as a WiFi access point (AP), and may also connect to the home WiFi router 206 for internet access to reach user application 207.

Figure 3:
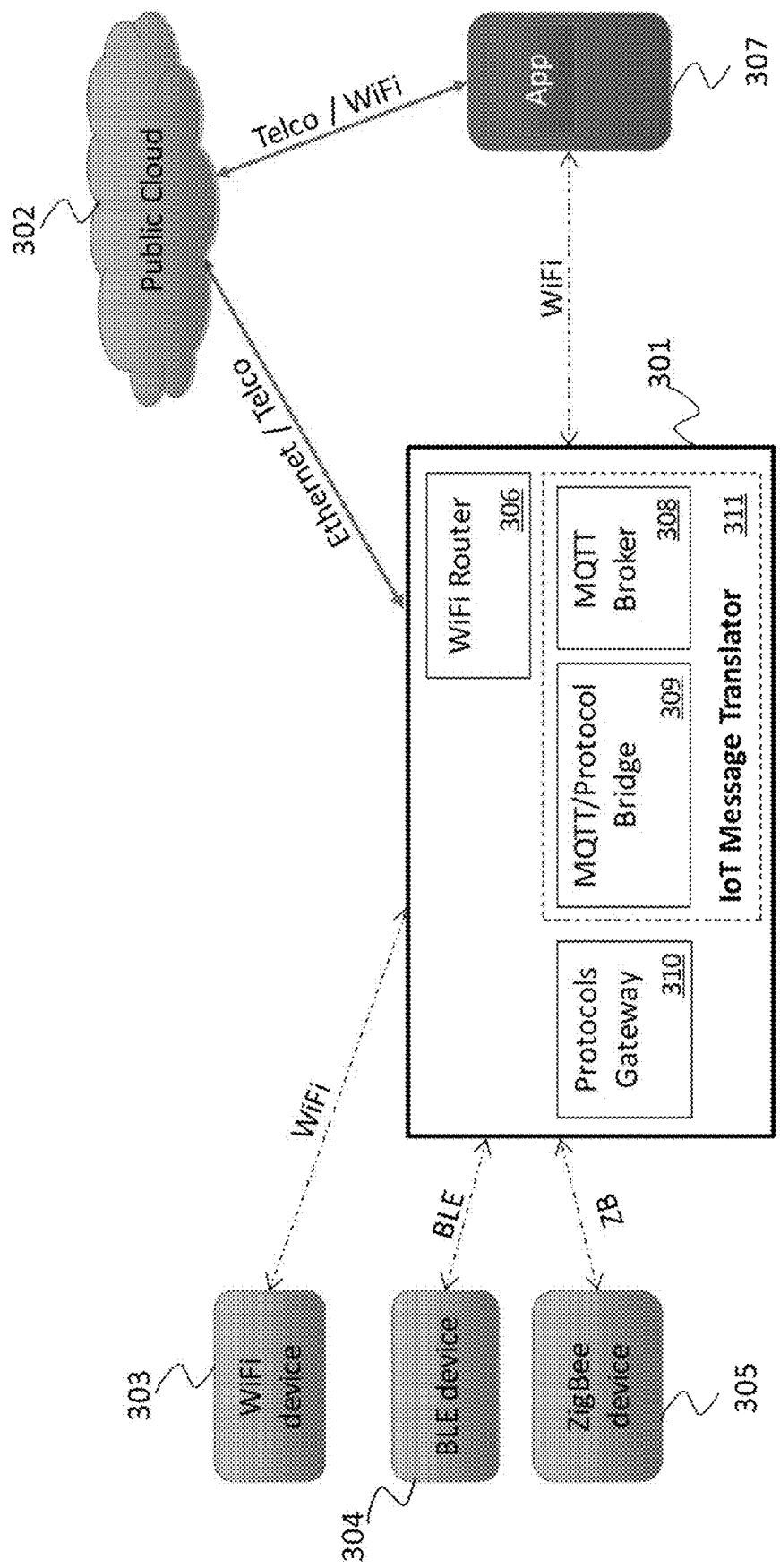
FIG. 3 shows a home computing cloud with a WiFi router capability in accordance with an embodiment.

FIG. 3 shows home computing cloud 301 with a WiFi router capability in accordance with an embodiment. Because home computing cloud 301 includes a WiFi router 306, all WiFi devices (for example, device 303) may be connected to it for accessing internet services by user applications 307 and/or public computing cloud 302. Moreover mobile devices 307 when in close proximity may also be connected to the home computing cloud 301 for accessing internet services.

FIG. 4 shows home computing cloud 401 that is interactive with public computing cloud 414 and user application 412 in accordance with an embodiment.

Similar to FIGS. 2 and 3, home computing cloud 401 interacts with IoT devices 404-406 via communication server (IoT gateway) 407, public computing cloud 414 via cloud interface 403, and mobile device 412.

Home computing cloud 401 comprises processing device 402, cloud interface 403, communication server 407, memory device 409, and storage device 411. In addition, home computing cloud 401 may include an embedded WiFi router 408 with some embodiments (for example as shown in FIG. 3).

Processing device 402 controls operation of home computing cloud 401 by executing computer readable instructions stored on memory device 409. For example, processing device 402 may execute computer readable instructions to execute an analytic model and learning algorithms. Embodiments may support a variety of computer readable media that may be any available media accessed by processing device 402 and include both volatile and nonvolatile media, removable and non-removable media. By way of example, and not limitation, computer readable media may comprise a combination of computer storage media and communication media.

Computer storage media may include volatile and nonvolatile, removable and non-removable media implemented in any method or technology for storage of information such as computer readable instructions, data structures, program modules or other data. Computer storage media include, but is not limited to, random access memory (RAM), read only memory (ROM), electronically erasable programmable read only memory (EEPROM), flash memory or other memory technology, CD-ROM, digital versatile disks (DVD) or other optical disk storage, magnetic cassettes, magnetic tape, magnetic disk storage or other magnetic storage devices, or any other medium that can be used to store the desired information and that can be accessed by the computing device.

Communication media typically embodies computer readable instructions, data structures, program modules or other data in a modulated data signal such as a carrier wave or other transport mechanism and includes any information delivery media. Modulated data signal is a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media.

Home computing cloud 401 may execute downloaded model 410 at memory device 409 from public computing cloud 402. Machine learning model 410 may comprise a neural network model processing data from IoT devices 404-406 as inputs resulting in one or more decision outputs from model 410.

Home computing cloud 401 may apply reinforcement learning to train the model if there is any corrective action to the predictive output from the model.

Home computing cloud 401 may support voice assistance unit 414 that facilitates a natural interaction with a user and home computing cloud 401 associated with an application executing on mobile device 412. For example, the user may articulate an IoT device request rather than entering the request through mobile device 412 when the user is in close proximity to voice assistance unit 414, for example a voice assistance electronic circuit. Continuing the example, the user may verbally request to subscribe to messages published by IoT device 305 (as shown in FIG. 3) through broker 308 when executing app 307 while viewing device data from IoT device 304 on the mobile device. Consequently, home computing cloud may handle multiple device operations in parallel, where one operation is initiated directly through mobile device 412 and the other through voice assistance unit 414.

Figure 5:
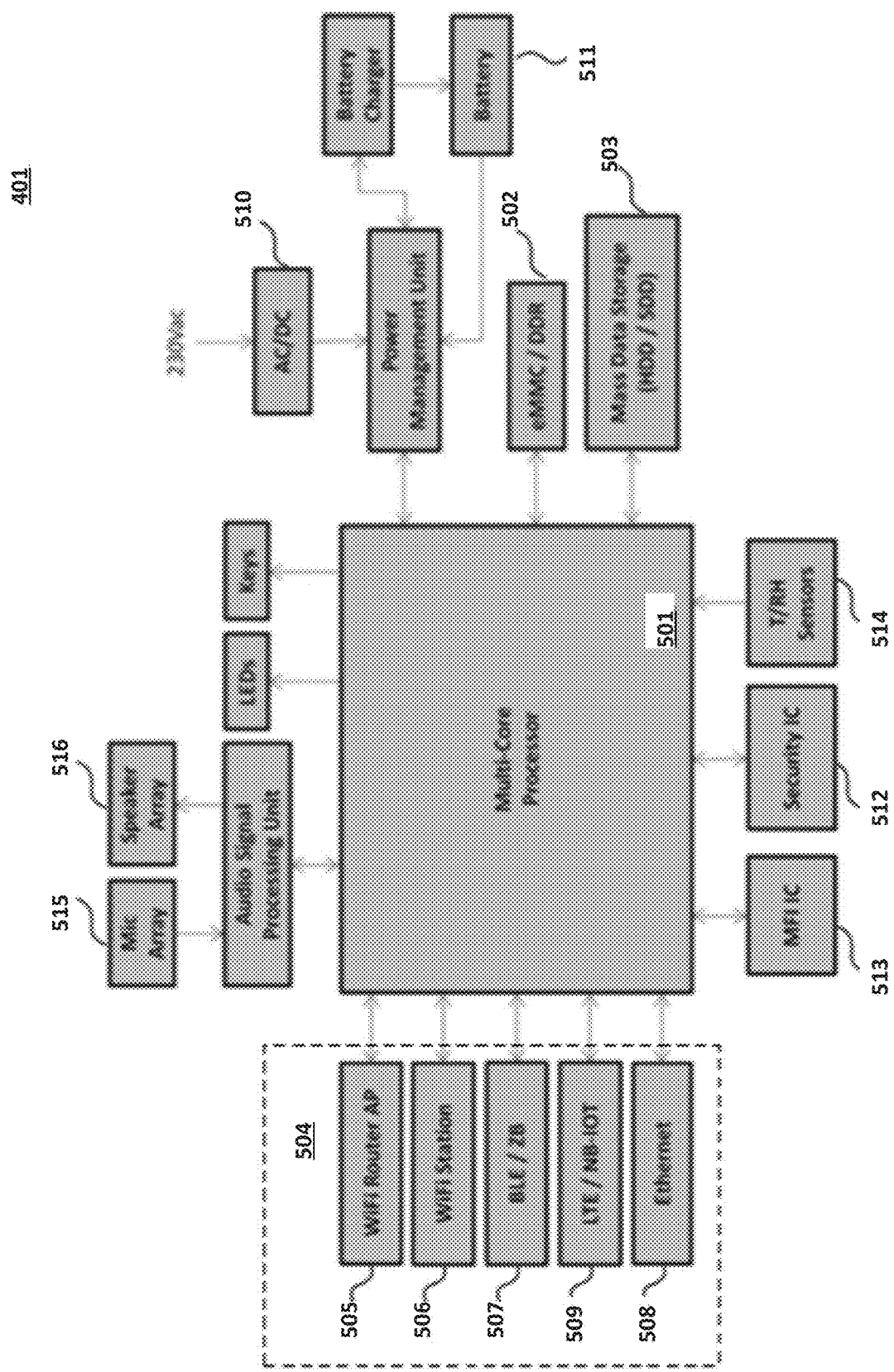
FIG. 5 shows a home computing cloud in accordance with an embodiment.

Voice assistance unit 414 integrates the voice assistance service software development kit (SDK) of an existing cloud solution to home cloud 401. For example, the Alexa Voice Service SDK may be integrated into home cloud 401. This unit utilizes the mic hardware (for example, mic array 515 as shown in FIG. 5) of home cloud 401 to monitor the triggering keyword and capture the voice data from a user. If it finds a matched keyword, it may send out a voice service request to an external service provider. The external service provider processes the request and sends the action plus the voice notification back to voice assistance unit 414. The action sent back from the external service provider may be a MQTT based message, which may trigger the rules engine on home cloud 401 to take care of subsequent actions. The voice notification may be played back by the speaker hardware (for example, speaker array 516) of home cloud 401 by voice assistant unit 414.

WiFi station mode is the entity to support the connection to Home WiFi router/Access Point (AP) and connect to the external internet. The WiFi station mode supports the setup of password to the home WiFi router and the WiFi encryption, such as WPA/WAP2/WPA3. It may also support both the 2.4 GHz and 5 GHz WiFi bands and different WiFi protocols, such as 802.11b/g/n/ac and WiFi-6 (802.11ax).

WiFi Access Point (AP) mode supports a connection to the router or modem, for example, cable modem or ADSL modem via Ethernet interface. The AP enables the WiFi connection capability for other WiFi devices to connect, following the 802.11b/g/n/ac and/or 802.11ax standard procedure. The WiFi devices (for instance, a mobile phone) may connect to the AP and be assigned with a local IP address and connect to the internet.

FIG. 5 shows home computing cloud 401 in accordance with an embodiment. Home computing cloud 401 may extend the connectivity, storage, and computational power of a home console. Core processor 501 may be a multi-core processor which is powerful enough to implement data analytic models such as model 410 (as shown in FIG. 4), and may retrain the model based on the manual corrections to the prediction outputs from the models. The algorithm for retraining the model may be limited due to the available computational power. If one or more graphical processing units (GPU's) are added to increase the system computational power, more complex re-training algorithm may be implemented such as those for video or thermal images.

The memory subsystem consists of embedded Multi-Media Controller/Double Data Rate (eMMC/DDR) 502 as well as mass memory storage 503. For example, an embodiment may have 64 GB eMMC, 4 GB DDR4 memory, and large (for example, 1 TB) mass data storage. Alternatively, a more complex system, which is capable of handling machine learning, may have 256 GB eMMC, 32 GB DDR4 memory, and 2 TB mass data storage or more. The mass data storage may be installed internally or externally and may be adjusted flexibly.

The connectivity subsystem of home computing cloud 401 may vary from a basic gateway to WiFi router gateway 504. The basic gateway may contain:
WiFi in AP/Station mode
BLE and Zigbee
LTE/NB-IoT (Cat-NB or Cat-M)

WiFi router gateway 504, which may support the router function with an embedded WiFi router, may contain:
WiFi in AP mode 505
WiFi in AP/Station mode 506
BLE and Zigbee 507
Ethernet 508

LTE module and/or NB-IoT module (for example, Cat-NB or Cat-M) 509 may be added to allow mobility to home computing cloud 401.

Power input 510 may be a basic 15 W, 3 A USB power adaptor for a basic gateway. For a more complex system, AC power source 510 may be used to provide a more flexible power distribution scheme to accommodate system needs. Rechargeable battery 511 may be added to maintain the operation in case of a power outage.

External security hardware 512 may be added to increase the access and data security level. Moreover, specific hardware 513,514 may be added to support additional services (for example, compatibility with iPod devices).

Audio inputs (for example, mic array 515) and outputs (for example, speaker array 516) may be added to support a natural interaction between a user and home computing cloud 401.

Figure 6:
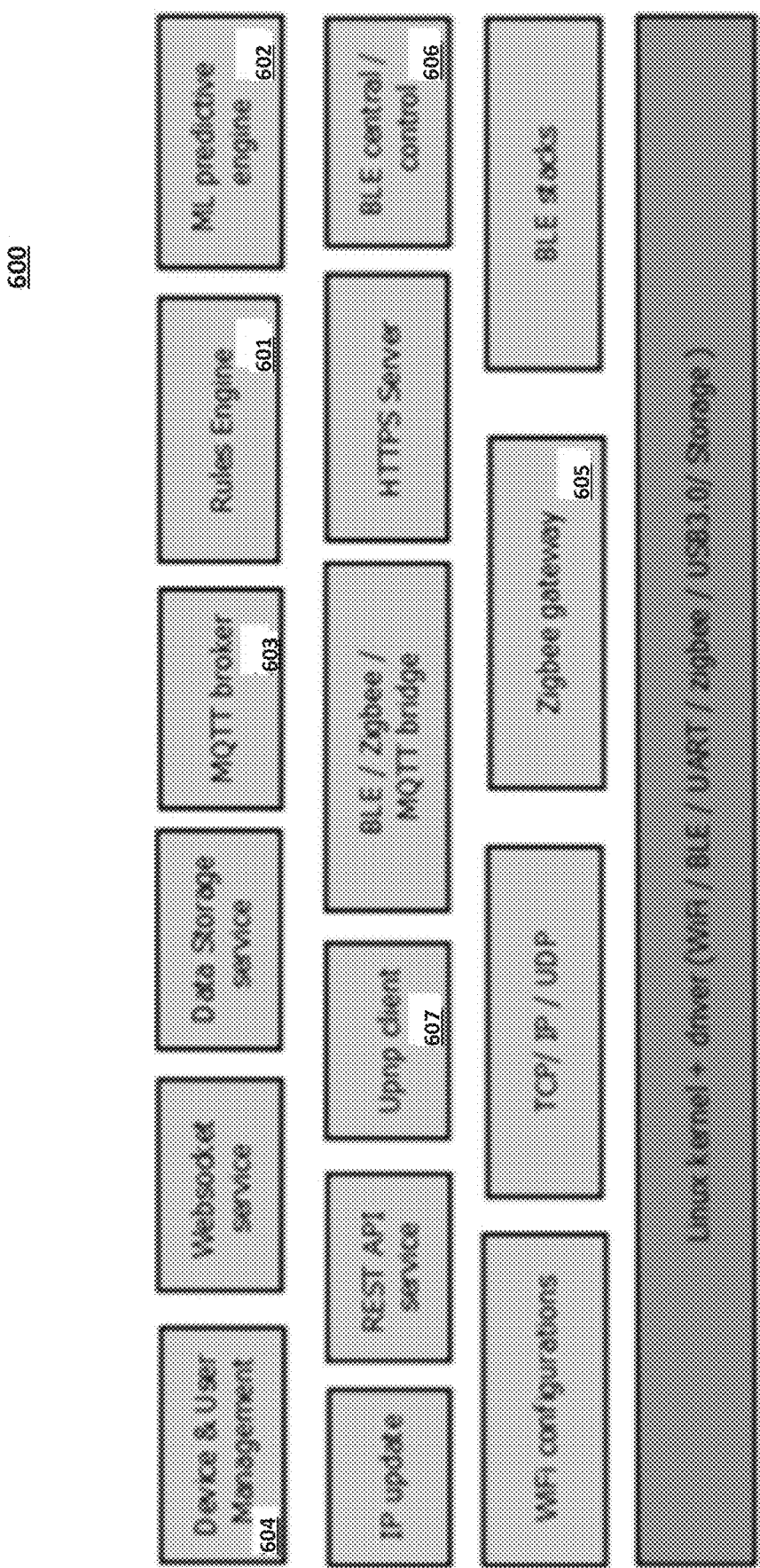
FIG. 6 shows software components of a home computing cloud in accordance with an embodiment.

FIG. 6 shows software components of home computing cloud 600 in accordance with an embodiment. Home computing cloud 600 may provide an IoT web console (not explicitly shown) for user to configure the system, to read IoT devices data, and to control the IoT devices. The web console may not use port 80 or 443 as to avoid the default port for HTTP and HTTPS. The web console may operate together with user applications, which may be a mobile app, a software application, a device application, terminal application, and so forth executing on a mobile device (for example, device 412 shown in FIG. 4).

The web console may be used to configure a user account for allowing access to home computing cloud 600. In addition, the web console may provide user controls for rules engine 601, and/or predictive model 602.

User controls may be manually created (either by the users, service providers, or a combination of both) and then executed by rules engine 601. Alternatively, user controls may be generated by a pre-trained model using a machine learning algorithm associated with predictive engine 602. The model may be adaptive to match the user behavior via an internal reinforcement learning model. New training models may be downloaded and adopted by the system.

Predictive engine 602 may comprise a neural network having a plurality of layers, each layer having a plurality of nodes. The neural network typically includes an input layer, one or more intermediate (hidden) layers, and an output layer. Each node of the input layer corresponds to an input to the neural network, and each node of the output layer corresponds to a resulting predictive output (in other words, a prediction).

For a home computing cloud which supports reinforcement learning, the predictive engine 602 may retrain the model itself when a corrective action is introduced.

The IoT web console may support the HTTPS/HTTP protocol. The IoT web console enables the user to, but not limited to:
1. Read sensor data back: The console may provide a web page for the user to browse the history of the sensor data, for example, the power consumption of a smart electrical socket.
2. To search, add or remove devices: The web page may allow a user to add or delete IoT devices (for example, devices 404-406 as shown in FIG. 4).
3. Device management: Through device and user management 604, a user may browse the device status, for example, low battery status, windows sensor open or close, socket on or off.
4. To configure rules engine 601 to enable a sequence or group of actions.
5. To configure predictive model 602 or reinforcement training algorithm.

The web console can be accessed by a user within the local WiFi network or externally through the internet.

Home computing cloud 600 implements MQTT message broker 603, which enables WiFi devices executing MQTT clients to subscribe or publish message via itself. Home computing cloud 600 may also support a mobile application to subscribe and publish via it and to communicate between IoT devices and user applications (for example, mobile apps, software applications, termination devices, and so forth) over the internet.

Sensor data may be externally published to via the internet through MQTT message broker 603. MQTT message broker 603 may also utilize the port forwarding service on the home WiFi router or the embedded WiFi router within home computing cloud 600. Port forwarding on home WiFi router 408 (as shown in FIG. 4) may be needed to support external internet access of the IoT Web console. If home computing cloud 301 (as shown in FIG. 3) also supports the WiFi router, then port forwarding may be performed internally and automatically within home computing cloud 301.

The local gateway function (for example, ZigBee gateway 605, BLE control 606, or MQTT broker 603) may publish MQTT messages locally. MQTT broker 603 may bridge the messages to other subscribed parties.

MQTT broker 603 is typically located in a remote public cloud server (for example, associated with public computing cloud 402 as shown in FIG. 4). Home computing cloud 600 installs MQTT broker 603 such that a mobile app can subscribe directly to MQTT broker 603 within home computing cloud 600. Hence, the mobile app can exchange messages directly with the home computing cloud via internet.

MQTT broker 603 may support a secure socket layer (SSL) MQTT connection.

Referring to Universal Plug and Play (UPnP) client 607, a UPnP control entity on a device may configure port forwarding of a home WiFi router via the UPnP protocol. An IoT server uses another port number excluding to 80 or 443. This approach avoids using the standard HTTP/HTTPS port number. To access the Web server from external internet, a user application with web browser function uses the same specific port number.

UPnP client 607 is not needed when home cloud gateway 306 supports an embedded WiFi router.

The device management entity 604 may include three main services of device management:
1. Connection detection: The on-line status for each device has to be monitored and reported to the MQTT broker periodically. A user app can monitor the device's on-line status via MQTT message.
2. Reboot: Device reboot control.
3. Software upgrade for connected devices.

REST API service 608 provides identity verification and authentication service. REST API service 608 may be used for the X.509 verification between the client application and corresponding REST API server. After client identity is verified, the client may obtain a user token for the access of MQTT topics. In addition, the device control and device status notification between the device and the user applications may also be supported by the REST API as well.

An entity continues to access the web page for obtaining the external IP address of the WiFi router. Once the external address is obtained, the web page periodically updates the domain name system (DNS) server with the external IP address and a user-defined URL address.

Home computing cloud 301 may provide a UI web page on its webserver for the setting of rules for users. The rules are a combination of sequence of ⌐ f, ⌐else actions for different devices. For example, if the door sensor open ( ⌐door open⌐, then the light turns on. Once the rule is defined, this information is parsed to the rules engine. The rules engine then monitors the status of the door switch. If it is opened, the light will be on. While user controls may be established by configuration information entered through the UI web page, a machine learning algorithm (for example, predictive engine 602) may update rules engine 601 with corresponding user control information.

Figure 7:
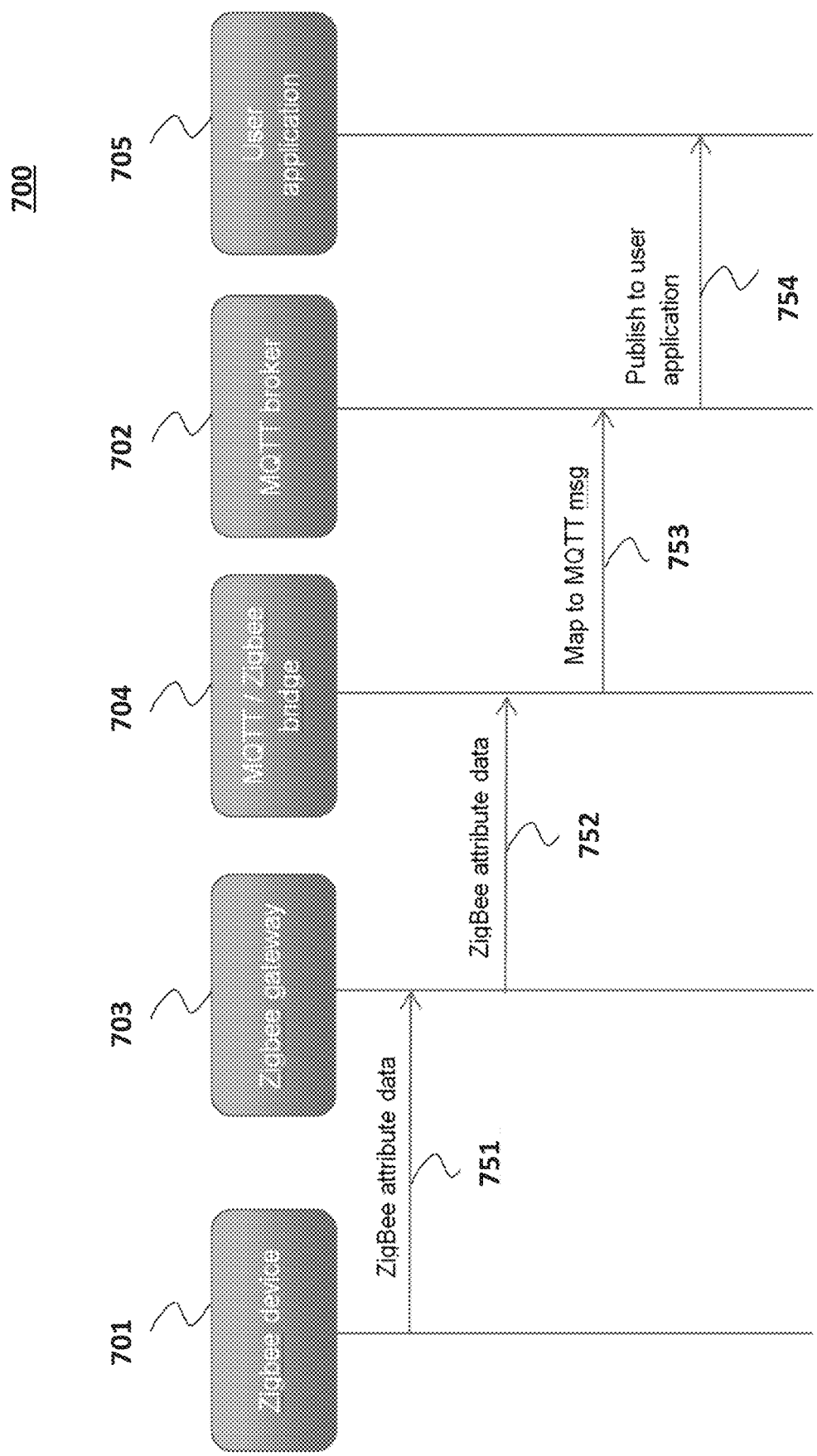
FIG. 7 shows the message sequence for a home computing cloud bridging a Zigbee device with a MQ Telemetry Transport (MQTT) broker in accordance with an embodiment.

FIG. 7 shows the message sequence 700 to bridge Zigbee device 701 with MQ Telemetry Transport (MQTT) broker 702 in accordance with an embodiment.

ZigBee attribute data 751, 752 may be updated to the home computing cloud through MQTT messages 753.

MQTT/ZigBee bridge 704 publishes and subscribes the messages to/from local MQTT broker 702. Device data is updated and stored into local mass data (for example, storage 411 of home computing cloud 401 as shown in FIG. 4). The data update may also be published to user application 705 that subscribes to the topic.

Figure 8:
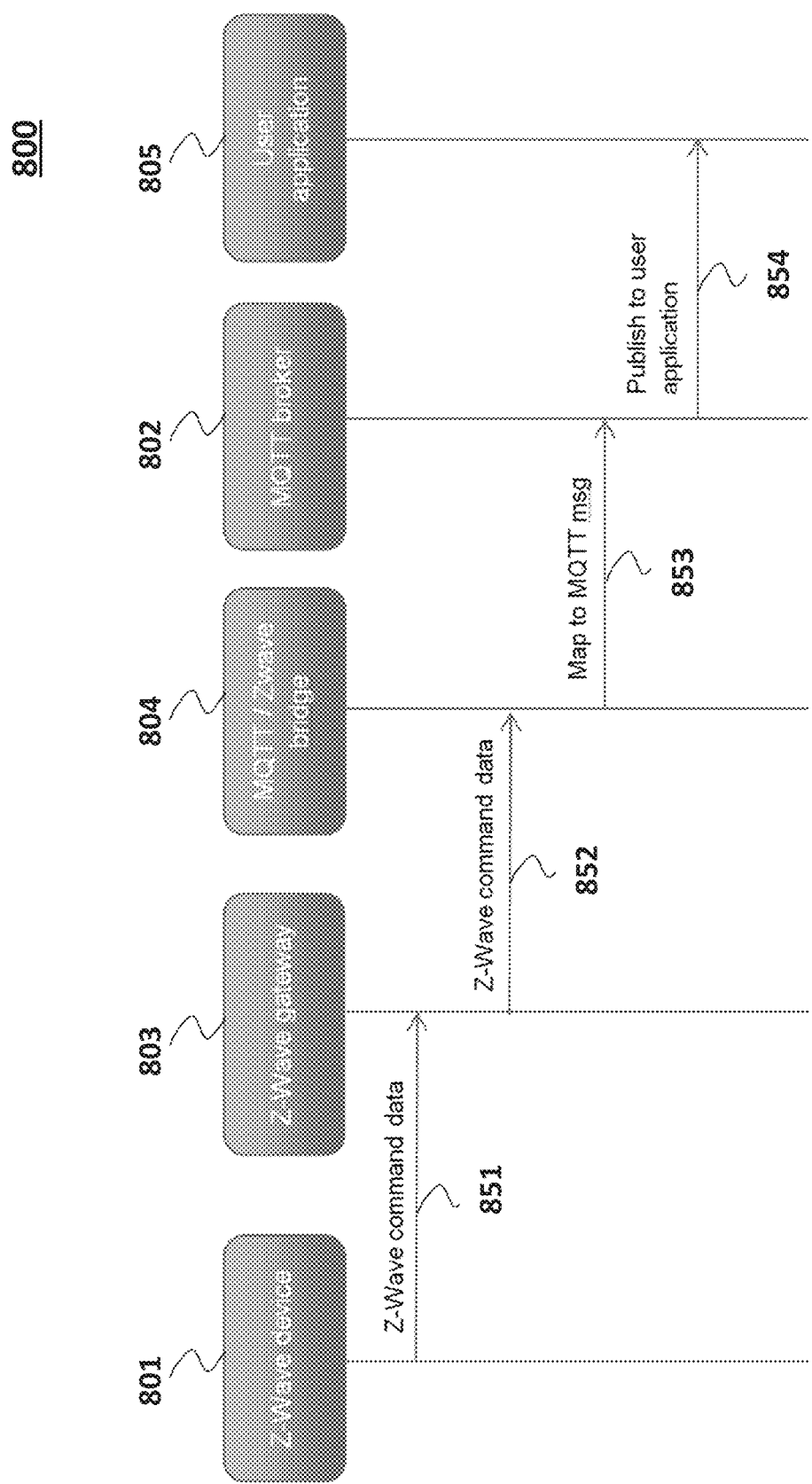
FIG. 8 shows message sequence for a home computing cloud bridging a Z-Wave device with a MQ Telemetry Transport (MQTT) broker in accordance with an embodiment.

FIG. 8 shows the message sequence 800 to bridge Z-Wave device 801 with MQ Telemetry Transport (MQTT) broker 802 in accordance with an embodiment. The home computing cloud may include Z-Wave gateway 803 and MQTT/Z-Wave bridge 804.

Similar with message sequence 700 as shown in FIG. 7, Z-Wave command data 851, 852 may be updated to the home computing cloud through MQTT messages 853. MQTT/Z-Wave bridge 804 publishes and subscribes the messages to/from local MQTT broker 802. Device data is updated and stored into the local mass data storage of the home computing cloud. The data update may also be published to user application 805 that subscribes to the topic.

Figure 9:
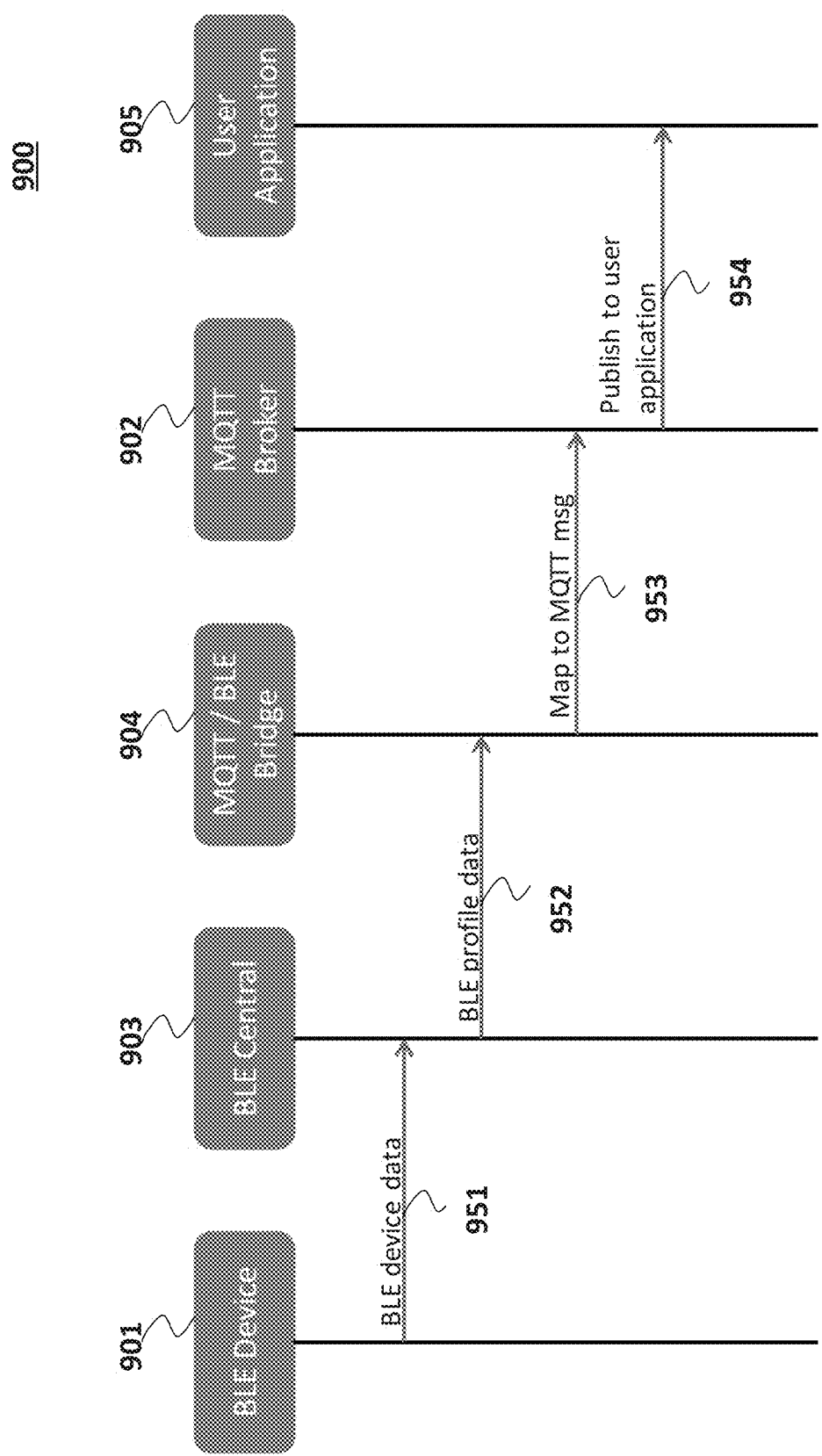
FIG. 9 shows the message sequence for a home computing cloud bridging a Bluetooth Low Energy (BLE) device with a MQ Telemetry Transport (MQTT) broker in accordance with an embodiment.

FIG. 9 shows the message sequence 900 to bridge a BLE device 901 with MQ Telemetry Transport (MQTT) broker 902 in accordance with an embodiment. The home computing cloud may include BLE central 903 and MQTT/BLE bridge 904.

BLE central 903 receives BLE device data 951, converts it to BLE profile data 952, and forwards it to MQTT/BLE bridge 904. MQTT/BLE bridge 904 re-constructs the BLE profile data into MQTT message 953. MQTT/BLE bridge 904 publishes and subscribes the messages to/from local MQTT broker 902. Device data is updated and stored into the local mass data storage of the home computing cloud. The data update may also be published to user application 905 that subscribes to the topic.

Figure 10:
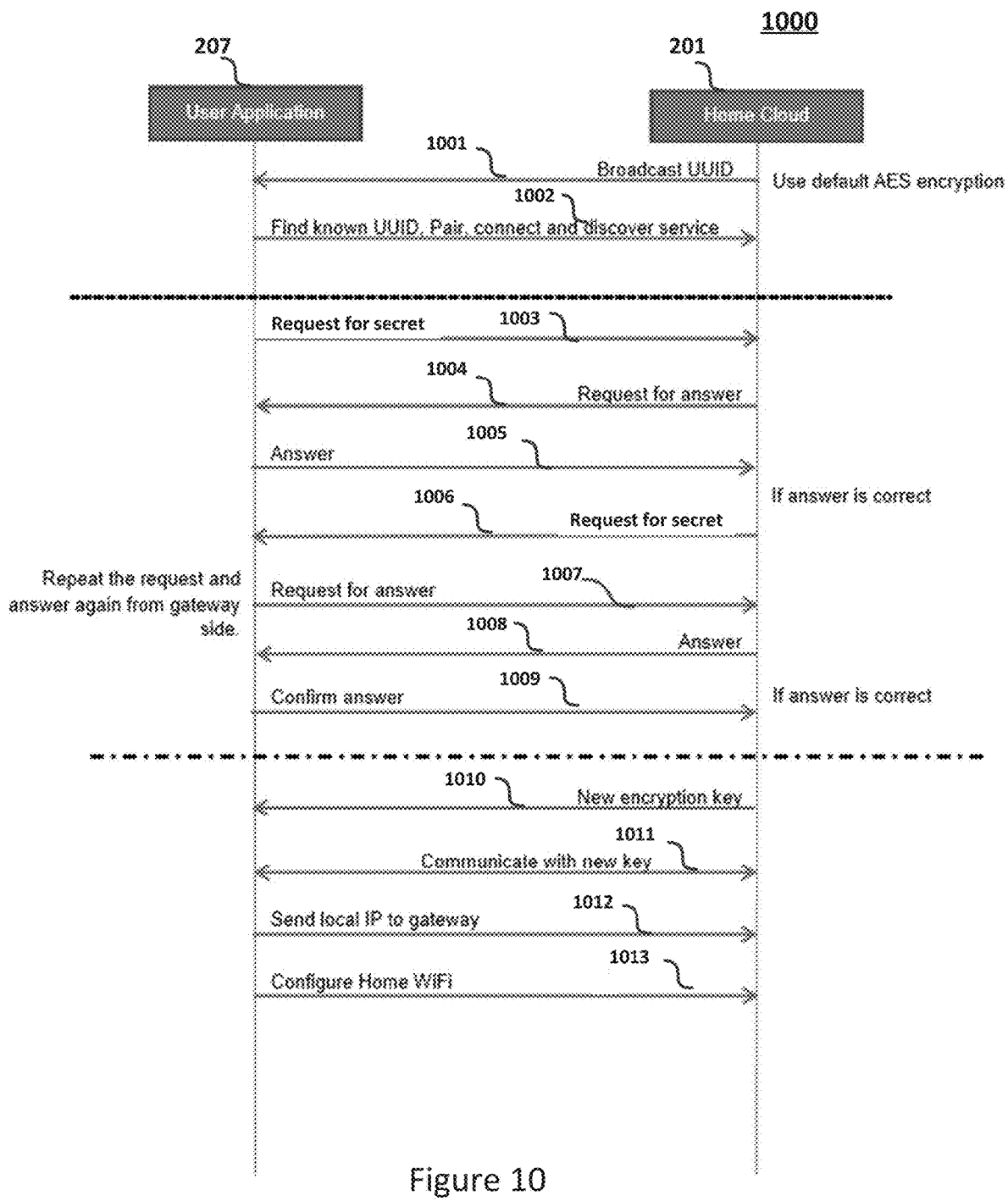
FIG. 10 shows the message sequence for configuring a WiFi router in a home computing cloud in accordance with an embodiment.

FIG. 10 shows the message scenario 1000 for configuring WiFi router 206 (as shown in FIG. 2) in home computing cloud 201 in accordance with an embodiment. With an embedded WiFi router setting, the configuration refers to a normal WiFi router setup page. The home cloud gateway uses the same authentication procedure as FIG. 10. Subsequently, the user may setup the normal router settings via a BLE connection.

The BLE communication for user application 207 may be used for setting up home cloud 201 with external WiFi router 206. In addition, it provides a secure connection, as shown in FIG. 10, for an authorization request. The secure connection may be over a WiFi connection, instead of a BLE connection, if home cloud 201 is already connected to the external WiFi router.

After home cloud 201 authorizes user application 207 and establishes the communication with user application 207, all other MQTT messages or IoT control messages may be conveyed by WiFi communication and user application 307, which may be part of user application 207. User application 207 may include all control functions of user application 307 plus mechanisms for account setup and authentication.

If the home cloud utilizes an embedded WiFi router, the secure connection, as shown in FIG. 10, may be implemented via either BLE or WiFi.

The embedded WiFi router may also support a traditional way of configuration by using WiFi AP mode. A user application may configure it from a configuration web page using a similar approach as for setting up an external WiFi router. However, if a user application needs to be authorized for IoT services, a secure connection may be established as shown in FIG. 10. After the user application is authorized and obtains the Client ID and Info, user application 307 may connect to the REST and MQTT services of the home cloud via WiFi.

Because home computing cloud 201 is typically headless, the user configuration process is often performed by user application 207 within the local network. As shown in message scenario 1000, WiFi configuration is performed in accordance with a secure BLE protocol.

WiFi router 206 broadcasts its universally unique identifier (UUID) in broadcast message 1001. User application 207 finds the known UUID and connects to WiFi router 206 when sending message 1002.

User application 207 and WiFi router 206 perform authentication through the messages 1003-1009 exchange. Request for answer message 1004 (and similarly message 1007) requests the other party to calculate the answer based on a list of random numbers sent from the requester side. Because both parties know how to calculate the answer based on the list of random numbers, this secret is known a priori by both parties. If the answers from both sides match, then both devices are authenticated devices. Upon successful completion, user application 207 receives an encryption key via message 1010. Communication is then established between user application 207 and WiFi router 206 during message exchange 1011.

With message scenario 1000, user application 207 knows the home computing cloud's local IP address corresponding to message 1012 so that a direct connection can be established, where the user can setup the normal router settings via message 1013.

Because a home computing cloud is headless, the user registration process is typically performed by the user application within the local network.

Figure 11:
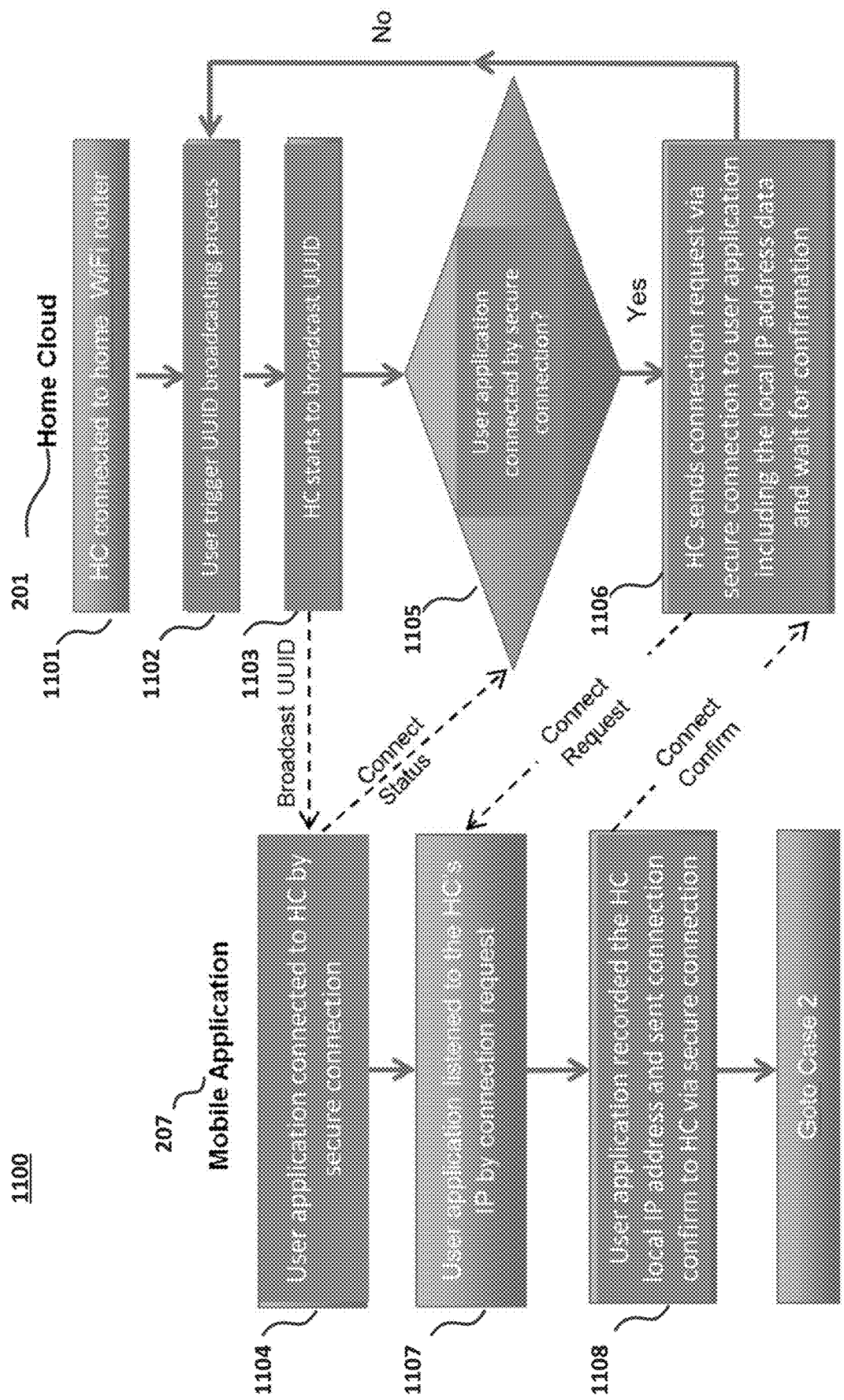
FIG. 11 shows an approach for connecting a user application within a home computing cloud in accordance with an embodiment.
Figure 12:
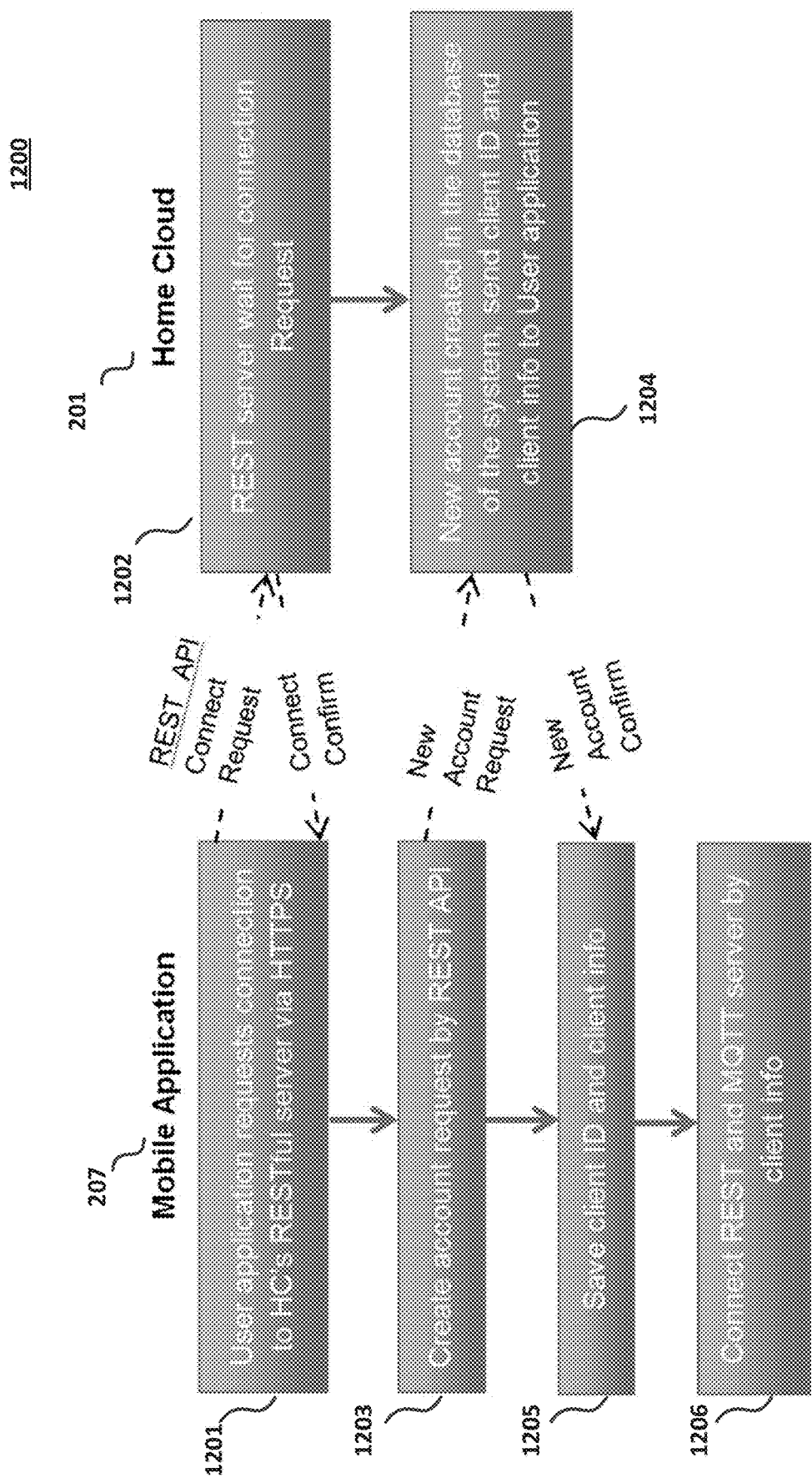
FIG. 12 shows an approach for connecting a user application within a home computing cloud in accordance with an embodiment.

FIGS. 11 and 12 show two approaches (which may be referred as case 1 and case 2, respectively) for establishing a local connection between a home computing cloud (which may be referred as a home cloud (HC)) and a user application.

FIG. 11 shows a first approach 1100, which is based on secure BLE. User application 1101 does not know the local IP address of home computing cloud 1102. FIG. 12 shows a second approach 1200, where a connection is directly established between mobile application 1201 and home computing cloud 1202 when the local IP address of the home computing cloud is known.

Referring to FIG. 11, at block 1101 home computing cloud (HC) 201 is connected to WiFi router 206 (as shown in FIG. 2). At block 1102, broadcasting is initiated so that the UUID is provided over a wireless broadcast channel at block 1103.

If BLE is utilized, the UUID may be broadcast using the mechanism defined per BLE specification. If WiFi is utilized, broadcasting of UUID is done via an IP broadcasting message. In addition, the mechanism of establishing a secure connection, as shown in FIG. 10, applies to IP messages over WiFi.

At blocks 1104 and 1105, user application 207 is connected to home computing cloud 201 over a secure wireless channel (for example, a BLE channel). User application 207 subsequently obtains the local IP address of home computing cloud 201 at blocks 1106-1108. When user application 207 obtains the local IP address, user application 207 proceeds to process 1200 as shown in FIG. 12. However, if user application 207 knows the local IP address a priori, user application 207 proceeds directly to process 1200 without executing process 1100.

Referring to FIG. 12, at blocks 1201 and 1202 user application 207 establishes a connection to a RESTful server of home computing system 201.

At blocks 1203-1205, user application 207 establishes a new account. User application 207 sends the new user name to home computing cloud 201, where the REST API supports the add user command. Consequently, home computing cloud 201 creates a new record for the new user. In addition, home computing cloud 201 also generates the SSH key pairs. The public key, the client certificates, and root certs are then sent to user application 207 to setup the SSL connection of MQTT packets.

Once user application 207 registers with home computing cloud 201 (as will be discussed in further detail), user application 207 can subscribe to the home cloud's MQTT broker and to control and to monitor the devices at block 1206.

Home computing cloud 201 supports IoT wireless devices such as, but not limited to, BLE, ZigBee devices and WiFi devices running MQTT client. Each device using different radio protocol that may be paired with home computing cloud 201.

Figure 13:
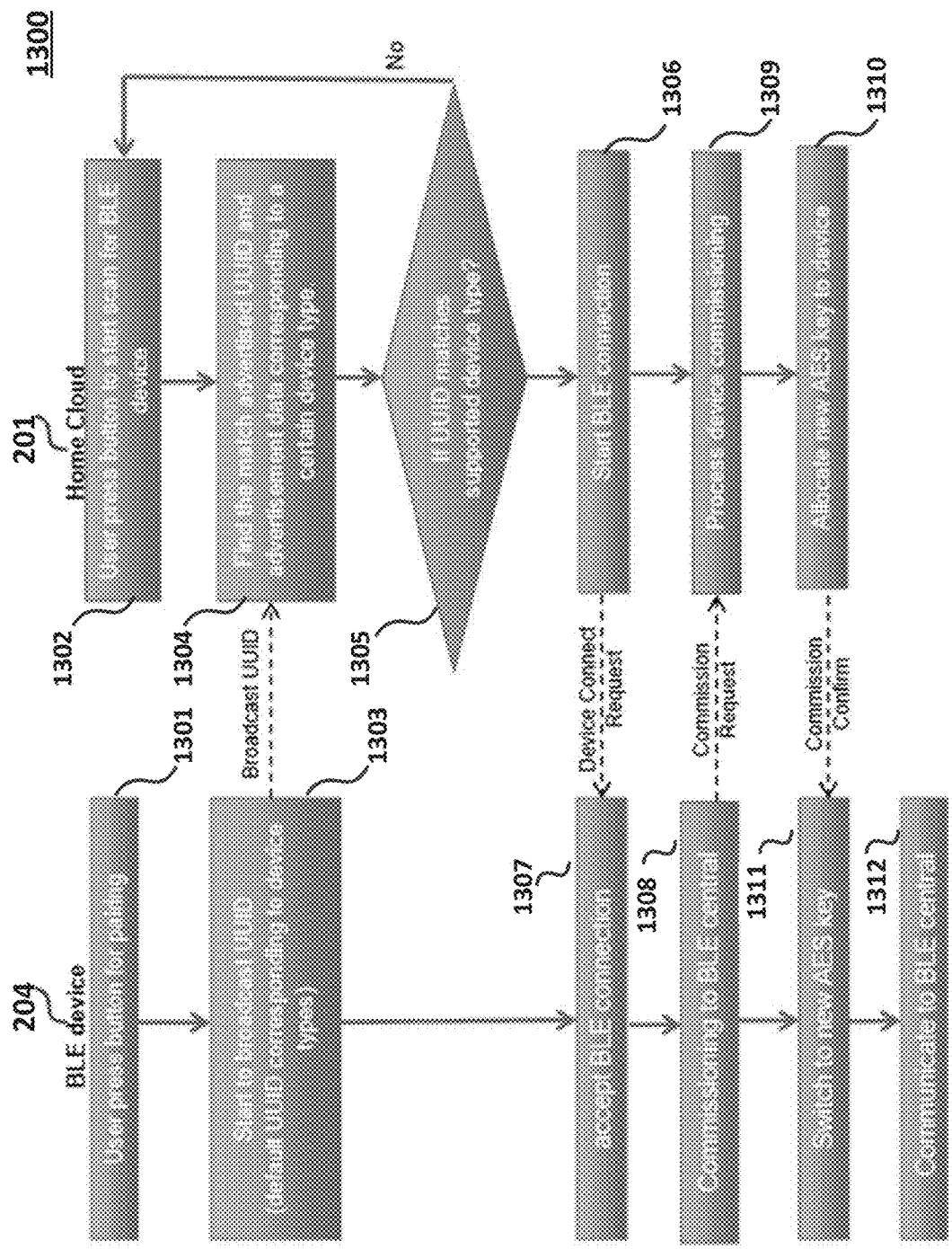
FIG. 13 shows an approach for registering a Bluetooth Low Energy (BLE) device with a home computing cloud in accordance with an embodiment.

FIG. 13 shows message scenario 1300 for registering BLE device 204 (as shown in FIG. 2) with home computing cloud 201 in accordance with an embodiment. ZigBee and Z-Wave device registrations are typically based on the corresponding protocols.

Pairing of BLE device 204 and home computing system 201 is initiated at blocks 1301 and 1302.

At block 1303, BLE device 204 broadcasts it UUID over the wireless broadcast channel. If recognized by home computing system 201 at blocks 1304-1305, a BLE connection is established between home computing system 201 and BLE device 204 at blocks 1306-1311.

At block 1312 BLE device 204 and home computing system 201 are able to communicate with each other, for example, BLE device 204 providing IoT data to home computing system 201 for processing.

The following describes some exemplary embodiments based on the above description:

With a first exemplary embodiment, a method and apparatus integrate a WiFi router, an IoT gateway, and a mass storage device to allow data to be retained locally for the applications of rules engine and data analytic model, for example, a home computing cloud. The rules engine and/or analytic model may support machine learning.

With a second exemplary embodiment, the home computing cloud allows user applications exchanging messages directly with the connected IoT devices via internet.

With a third exemplary embodiment, an apparatus may include a storage capability that includes a mass data storage device, a HDD, a SSD or interfaces to external hard disk via USB3.0 to allow machine learning and data analytic locally to protect data privacy. The storage capability may also support the storage of a large amount of sensor and/or IoT device's data.

With a fourth exemplary embodiment, a pre-trained model is downloaded from a public computing cloud. The pre-trained model may be adopted by a home computing cloud as a starting point for reinforcement learning (training) locally within the home computing cloud.

With a fifth embodiment, a home computing cloud comprises an IP updater that sends a request to a remote DNS server to update its IP address such that a user application or a browser can obtain the outside IP address of the home (private) computing cloud. When operating in conjunction with the DNS, a domain name may be mapped to the IP address of the gateway of the home computing cloud.

With a sixth embodiment, an apparatus with a web-socket server allows a user application to obtain an always-on connection without the need to keep polling. The web socket server may be used by the device to provide a connection for the user mobile application.

With a seventh embodiment, an apparatus with a HTTP/HTTPS server provides a web-based interface for home IoT control of paired or connected devices such as ZigBee devices, Z-Wave devices, BLE devices or WiFi connected devices.

With an eighth embodiment, an apparatus with a REST API server provides RESTful IoT control for the user application service, for example, user registration and device management.

With a ninth embodiment, an apparatus with a database control utilizes a data storage service, for example, SQLite, to manage the large amount of data efficiently.

With a tenth embodiment, an apparatus with a MQTT broker (or similar service) supports connected MQTT-based devices. All MQTT-based devices may communicate internally within the same network.

With an eleventh embodiment, an apparatus may include a gateway for different radio subsystems bridging different type of devices, such as ZigBee, Z-Wave, BLE, and so forth. The apparatus may bridge ZigBee to MQTT, Z-Wave to MQTT, and BLE to MQTT.

With a twelfth embodiment, an apparatus may support multiple account access control with different user connections via an authentication protocol. User applications may connect to the apparatus internally or externally.

With a thirteenth embodiment, an apparatus with an UPnP capability supports port forwarding function on a WiFi router of a home computing cloud.

With a fourteenth embodiment, an apparatus, through a secure BLE connection protocol, enables a mobile device to configure a home computing cloud, such as a home WiFi router configuration.

With a fifteenth embodiment, an apparatus integrates a voice assistance function (for example, Amazon Alexa, Google Home) with a local application to provide a natural interaction between a user and the apparatus.

As can be appreciated by one skilled in the art, a computer system with an associated computer-readable medium containing instructions for controlling the computer system can be utilized to implement the exemplary embodiments that are disclosed herein. The computer system may include at least one computer such as a microprocessor, digital signal processor, and associated peripheral electronic circuitry.

What is claimed is:

1. A home computing system interacting with supported Internet of Things (IoT) devices, the home computing system comprising:
   a home computing cloud gateway further comprising a WiFi router;
   a cloud interface configured to exchange information with a public computing cloud;
   a communications gateway configured to interface a first IoT device and a second IoT device, wherein the first IoT device supports a first communication protocol and the second IoT device supports a second communication protocol;
   a processor for executing computer-executable instructions;

a memory storing the computer-executable instructions that when executed by the processor cause the home computing system to:
receive a first message and a second message from the first IoT device and the second IoT device, respectively, wherein the first message and the second message conform to the first communication protocol and the second communication protocol, respectively;
translate the first message and the second message from the first communication protocol and the second communication protocol, respectively, to an IoT protocol;
transmit the translated first message and the translated second message directly to a user application of a user via the WiFi router;
download, from the public computing cloud through the cloud interface, a selected data analytic model from a plurality of data analytic models based on the supported IoT devices;
locally execute the data analytic model;
retrieve locally retained IoT data;
provide the locally retained IoT data to the data analytic model;
in response to the providing, obtain a predictive result from the data analytic model; and
apply the predicative result to at least one of the supported IoT devices.

2. The home computing system of claim 1, comprising:
a web-socket server;
wherein the memory storing computer-executable instructions that when executed by the processor further cause the home computing system to:
establish a connection between the user application and the home computing system via the web-socket server, wherein the connection circumvents polling by the user application.

3. The home computing system of claim 1, wherein the memory storing computer-executable instructions that when executed by the processor further cause the home computing system to:
obtain a published message from the first IoT device;
forward the published message to the user application when the user application subscribes to a corresponding topic.

4. The home computing system of claim 1 further comprising:
a mass storage device;
wherein the memory storing computer-executable instructions that when executed by the processor further cause the home computing system to:
obtain IoT data from the supported IoT devices; and
locally retain the IoT data on the mass storage device; and
locally process the locally retained IoT data.

5. The home computing system of claim 4, wherein the memory storing computer-executable instructions that when executed by the processor further cause the home computing system to:
generate a relational database from the locally retained IoT data stored on the mass storage device;
receive a structured query language (SQL) command from the user application; and
in response to the receiving, manipulate the retained IoT data based on the SQL command.

6. The home computing system of claim 1 further comprising:
a voice assistance unit;
wherein the memory storing computer-executable instructions that when executed by the processor further cause the home computing system to:
obtain a voice input from the user while the user application is activated; and
generate, through the voice assistance unit, a IoT data request about at least one of the supported IoT devices.

7. The home computing system of claim 1, wherein the memory storing computer-executable instructions that when executed by the processor further cause the home computing system to:
generate an IoT web console;
read, through the IoT web console, device data from one or more IoT devices;
control, through the IoT web console the one or more IoT devices,
wherein the IoT web console is interactive with the user application.

8. The home computing system of claim 3, wherein the memory storing computer-executable instructions that when executed by the processor further cause the home computing system to:
receive a registration request from the user application;
in response to the receiving, generate a record for the user and send a key pair to the user application; and
when the registration is successfully completed, allow a subscription of the user application of the corresponding topic.

9. The home computing system of claim 1, wherein the memory storing computer-executable instructions that when executed by the processor further cause the home computing system to:
send, to a remote, a domain name server, an IP address request to update an IP address of the home computing cloud gateway, wherein the user application is able to access the home computing system via the updated IP address.

10. The home computing system of claim 1, wherein the memory storing computer-executable instructions that when executed by the processor further cause the home computing system to:
establish a secure connection with a mobile device;
receive configuration information over the secure connection; and
configure the home computing cloud gateway based on the configuration information.

11. A method for supporting a home computing system, the method comprising:
receiving a first published message and a second published message from first IoT device and second IoT devices, respectively, wherein the first published message and the second published message conform to a first communication protocol and a second communication protocol, respectively;
translating the first published message and the second published message from the first communication protocol and the second communication protocol, respectively, to an IoT protocol;
when a first user application subscribes only to a first topic associated with the first IoT device, transmitting only the first translated message directly to a first user application;
when a second user application subscribes both to the first topic and to a second topic associated with the second IoT device, transmitting the first translated message and the second translated message directly to a second user application;

downloading, by the home computing system from a public computing cloud, a selected data analytic model from a plurality of data analytic models based on supported IoT devices;

locally executing, by the home computing system, the data analytic model;

retrieving, by the home computing system from a mass storage device, locally retained IoT data;

providing, by the home computing system, the locally retained IoT data to the data analytic model;

in response to the providing, by the home computing system, obtaining a predictive result from the data analytic model; and applying, by the home computing system, the predictive result to at least one of the supported IoT devices.

12. The method of claim 11, wherein the IoT protocol comprises a MQ Telemetry Transport (MQTT) protocol, wherein the first and second communication protocols are selected from a WiFi protocol, a Zigbee protocol, a Z-Wave protocol, and a BLE protocol, and wherein the first and second communication protocols are different.

13. The method of claim 11 comprising:
when the home computing system is connected to an external home WiFi router, configuring port forwarding of the external home WiFi router via a Universal Plug and Play (UPnP) protocol.

14. The method of claim 11 comprising:
authenticating the first user application via a first connection; and
authenticating the second user application via a second connection, wherein the first and second connections are active during a same time duration.

15. The method of claim 11 comprising:
receiving, by the home computing system from a public computing cloud, external information; and
combining the external information with the predictive result to initiate an action by the at least one of the supported IoT devices.

16. The method of claim 11 comprising:
receiving, by a rules engine, a third published message from a third IoT device;
triggering, by the rules engine, an alert; and
sending, by the rules engine, the alert to one of the first and second user applications.

17. The method of claim 11 comprising:
obtaining a voice input while the first user application is executing; and
generating, through a voice assistance unit, a IoT data request about at least one of the supported IoT devices.

18. A non-transitory computer-readable medium having instructions stored thereon that, when executed, cause a computing device to:
downloading, from a public computing cloud, a selected data analytic model from a plurality of data analytic models based on supported IoT devices;
locally executing the data analytic model;
retrieving, from a mass storage device, locally retained IoT data;
providing the locally retained IoT data to the data analytic model;
in response to the providing, obtaining a predictive result from the data analytic model;
receiving, from a public computing cloud, external information;
combining the external information with the predictive result; and
applying the combined external information and predictive result to at least one of the supported IoT devices;
receiving a first published message and a second published message from first IoT device and second IoT device, respectively, wherein the first message and the second message conform to a first communication protocol and a second communication protocol, respectively;
translating the first published message and the second published message from the first communication protocol and the second communication protocol, respectively, to an IoT protocol;
when a first user application subscribes only to a first topic associated with the first IoT device, transmitting only the first translated message directly to the first user application; and
when a second user application subscribes both to the first topic and to a second topic associated with the second IoT device, transmitting the first translated message and the second translated message directly to the second user application.

* * * * *